United States Patent
Schuld et al.

(10) Patent No.: US 9,114,342 B2
(45) Date of Patent: Aug. 25, 2015

(54) FILTER WITH COVERED EDGES

(71) Applicant: RPS Products, Inc., Hampshire, IL (US)

(72) Inventors: Daniel E. Schuld, Inverness, IL (US); Donald N. Jursich, Crystal Lake, IL (US)

(73) Assignee: RPS Products, Inc., Hampshire, IL (US)

( * ) Notice: Subject to any disclaimer, the term of this patent is extended or adjusted under 35 U.S.C. 154(b) by 301 days.

(21) Appl. No.: 13/705,998

(22) Filed: Dec. 5, 2012

(65) Prior Publication Data
US 2014/0150385 A1 Jun. 5, 2014

(51) Int. Cl.
*B01D 46/00* (2006.01)
*B01D 46/10* (2006.01)
*B01D 46/52* (2006.01)

(52) U.S. Cl.
CPC ........ B01D 46/0004 (2013.01); B01D 46/0006 (2013.01); B01D 46/10 (2013.01); B01D 46/521 (2013.01)

(58) Field of Classification Search
CPC ............... B01D 46/0004; B01D 2271/022; B01D 46/0006; B01D 46/10; B01D 46/521
USPC ........................... 55/481, 502, 497
See application file for complete search history.

(56) References Cited

U.S. PATENT DOCUMENTS

| | | | |
|---|---|---|---|
| 2,663,660 A * | 12/1953 | Layte | 156/201 |
| 2,988,169 A | 6/1961 | Klein | |
| 3,005,516 A | 10/1961 | Klein | |
| 3,125,427 A | 3/1964 | Smith | |
| 3,712,033 A | 1/1973 | Gronholz | |
| 3,778,985 A | 12/1973 | Daigle et al. | |
| 3,789,589 A | 2/1974 | Delany | |
| 4,177,050 A | 12/1979 | Culbert | |
| RE32,851 E | 1/1989 | Tarala | |
| 5,013,438 A | 5/1991 | Smith | |
| 5,167,740 A | 12/1992 | Michaelis et al. | |
| 5,308,369 A * | 5/1994 | Morton et al. | 55/379 |
| 5,589,067 A * | 12/1996 | Rice | 210/493.5 |
| 5,779,747 A | 7/1998 | Schlor et al. | |
| 5,840,094 A | 11/1998 | Osendorf | |
| 6,110,243 A * | 8/2000 | Wnenchak et al. | 55/379 |
| 6,126,708 A | 10/2000 | Mack et al. | |
| 6,152,980 A | 11/2000 | Culwell | |
| 6,179,888 B1 * | 1/2001 | Mangiaforte | 55/341.1 |
| RE37,163 E * | 5/2001 | Oussoren et al. | 55/486 |
| 6,264,713 B1 | 7/2001 | Lewis, II | |
| 6,387,143 B1 * | 5/2002 | Adiletta | 55/497 |
| 6,450,345 B1 * | 9/2002 | Adams et al. | 209/399 |
| 6,485,538 B1 | 11/2002 | Toyoshima | |
| 6,521,011 B1 * | 2/2003 | Sundet et al. | 55/499 |
| 6,592,643 B2 * | 7/2003 | Shah et al. | 55/497 |
| 6,599,343 B2 | 7/2003 | Fredrick | |
| 6,638,333 B2 | 10/2003 | Schuld | |
| 6,652,613 B2 | 11/2003 | Shah | |

(Continued)

Primary Examiner — Amber Orlando
Assistant Examiner — Stephen Hobson
(74) Attorney, Agent, or Firm — Greer, Burns & Crain, Ltd.

(57) ABSTRACT

A filter insertable into an air filter enclosure includes a flexible support member, a filter media layer, and a pair of end caps. The filter media layer is attached to the support member. Side edges of the filter media layer are folded over edges of the support member to form filter cushions, such that the filter media layer covers the edges of the support member. The filter cushions are designed to conform to the air filter enclosure to ensure an effective seal between the enclosure and the filter.

8 Claims, 5 Drawing Sheets

(56) References Cited

U.S. PATENT DOCUMENTS

| | | |
|---|---|---|
| 6,723,150 B2 | 4/2004 | Parker |
| 6,814,773 B2 | 11/2004 | Shah |
| 6,833,017 B2 * | 12/2004 | Quigley .................... 55/497 |
| 7,048,501 B2 * | 5/2006 | Katayama et al. ......... 415/121.2 |
| 7,452,396 B2 | 11/2008 | Terlson et al. |
| 7,497,888 B2 | 3/2009 | Ashwood et al. |
| 7,537,630 B2 | 5/2009 | Schuld et al. |
| 7,670,398 B2 * | 3/2010 | Modesto ..................... 55/374 |
| 7,727,299 B2 * | 6/2010 | Knowles ..................... 55/497 |
| 8,157,881 B1 | 4/2012 | Anoszko |
| 8,512,499 B2 * | 8/2013 | Golden et al. ............... 156/210 |
| 2003/0070406 A1 * | 4/2003 | Duffy ......................... 55/497 |
| 2004/0182055 A1 * | 9/2004 | Wynn ......................... 55/497 |
| 2005/0126138 A1 * | 6/2005 | Anderson et al. ............ 55/498 |
| 2006/0053759 A1 * | 3/2006 | Winters et al. .............. 55/497 |
| 2006/0277879 A1 * | 12/2006 | Knowles ..................... 55/497 |
| 2009/0151312 A1 * | 6/2009 | Ashwood et al. ............ 55/511 |
| 2011/0048057 A1 * | 3/2011 | Lee et al. .................... 62/408 |
| 2012/0159915 A1 * | 6/2012 | Heckel et al. ................ 55/510 |

* cited by examiner

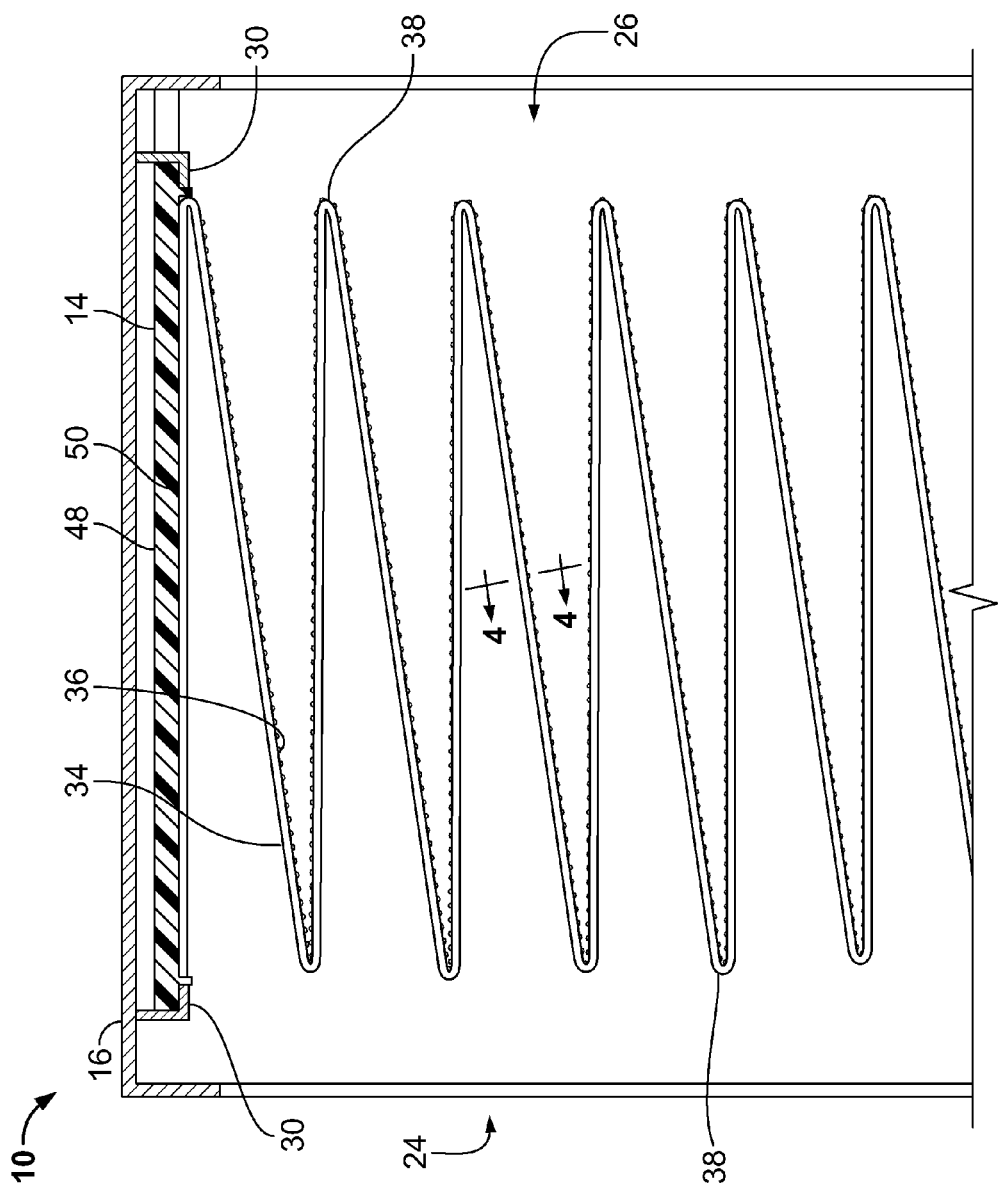

FILTER WITH COVERED EDGES

BACKGROUND

Pleated filter media, such as collapsible pleated mechanical media (ESPM) filters, occupy substantially less space in their collapsed state, compared to equivalent cartridge configurations. Thus, they are easier to store and ship, and consequently have lower storage and shipping costs. However, collapsible filters are substantially less user-friendly than equivalent cartridge-style filters, which can be easily inserted into and removed from the filter enclosure with only minimal user interaction. In contrast, collapsible filters can require assembly by the end user before they are ready to be installed into the filter housing. For example, one such air cleaner includes an inner housing, an outer housing, and a door. Effort is required to ensure that, after installation, the filter forms an effective seal in the filter enclosure such that air must pass through the filter and not around the filter. Thus, there exists a need for a collapsible filter that forms an effective seal with the filter enclosure with minimal effort by the end user.

SUMMARY OF THE INVENTION

The present disclosure is directed to an air filter for use in a forced-air system that forms an effective seal with the filter enclosure. A filter is designed for an air cleaner that has a filter enclosure that has a width $W_1$, and top and bottom channels. The air cleaner is adapted to direct air to flow through the filter enclosure from an upstream to a downstream direction. The filter includes a flexible support member with first and second side edges. The support member has a width $W_2$ that is substantially equal to but less than $W_1$. The filter also includes a filter media layer connected to and covering at least one side of the support member and has an unfolded width $W_3$ that is greater than the width $W_2$ of the support member, such that the filter media, when unfolded, extends beyond the first and second side edges of the support member to form filter media skirts. The filter media skirts are folded over the respective first and second side edges of the support member to cover the side edges and form a filter media cushion on the side edges of the filter. The filter with folded over skirts has a width $W_4$ that is equal to or, more preferably, slightly greater than the width $W_1$ of the enclosure. When the filter is positioned in the enclosure, the filter media cushions conform to the enclosure thereby forming an effective seal.

The filter is configured to be positioned in the enclosure with the support member downstream from the filter media with respect to the direction of airflow from the filter media layer. Also, the filter is pleated and collapsible.

Finally, a pair of end caps can be attached to a top and a bottom end portions of the flexible metal support member. The end caps are configured to engage the top and the bottom channels of the enclosure.

BRIEF DESCRIPTION OF THE DRAWINGS

FIG. 3 is a transverse cross-section of the first embodiment of the filter taken along line 3-3 of FIG. 2.

DETAILED DESCRIPTION

Figure 1:
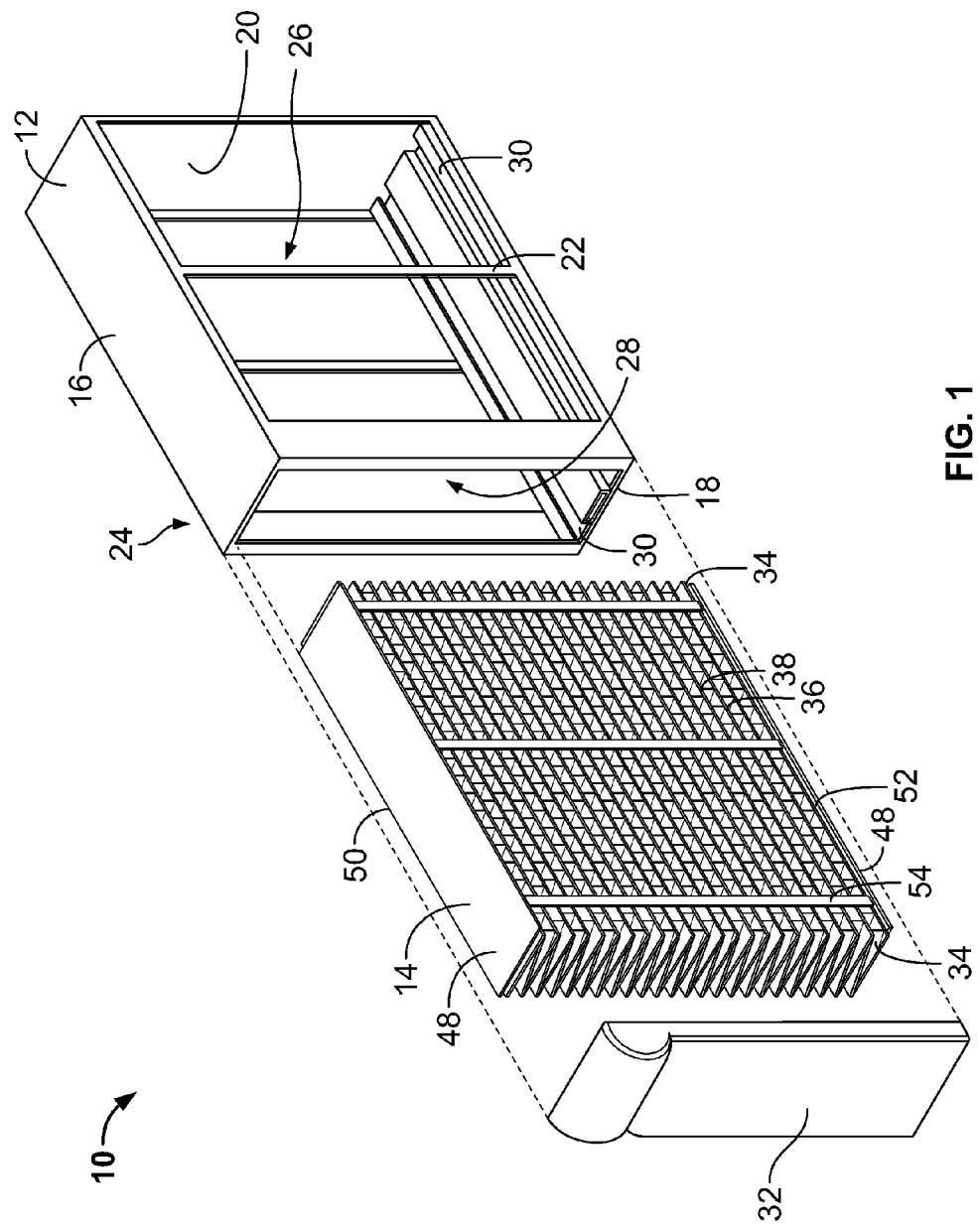
FIG. 1 is an isometric exploded view of a frame and a first embodiment of a filter according to the invention.

Referring to FIG. 1, an air cleaner is generally designated 10 and includes a frame enclosure 12 and a filter 14. The frame enclosure 12 includes a top wall 16, a bottom wall 18, a rear wall 20, and a reinforcement member 22. The enclosure 12 has an upstream air-inlet opening 24 and a downstream air-outlet opening 26. In addition, the enclosure 12 has a filter opening 28 that is opposite the rear wall 20. The enclosure 12 can further include guide tracks 30 adjacent to the top wall 16 and the bottom wall 18 and that extend from at or near the rear wall 20 to at or near the filter opening 28. A door 32 is attachable to the frame enclosure 12 to close the filter opening 28.

Filter 14 is preferably a generally planar, pleated filter media such as a collapsible extended surface pleated mechanical media filter (ESPM) type such that the filter occupies substantially less space in its collapsed stated than in its expanded state. Typically, filter 14 is transported and sold in a collapsed state. At the time of installation, the filter is expanded, as shown in FIG. 1. The filter 14 is configured to be insertable into the frame enclosure 12 through the filter opening 28. When inserted, the filter 14 extends between the top and bottom walls, 16 and 18 respectively, between the rear wall 20 and the filter opening 28, and between the air-inlet opening 24 and the air-outlet opening 26. Consequently, when the door 32 is closed, air can be directed to flow through the air cleaner 10 from the air-inlet opening 24, through the filter 14, and then exiting through the air outlet-opening 26.

Figure 2:
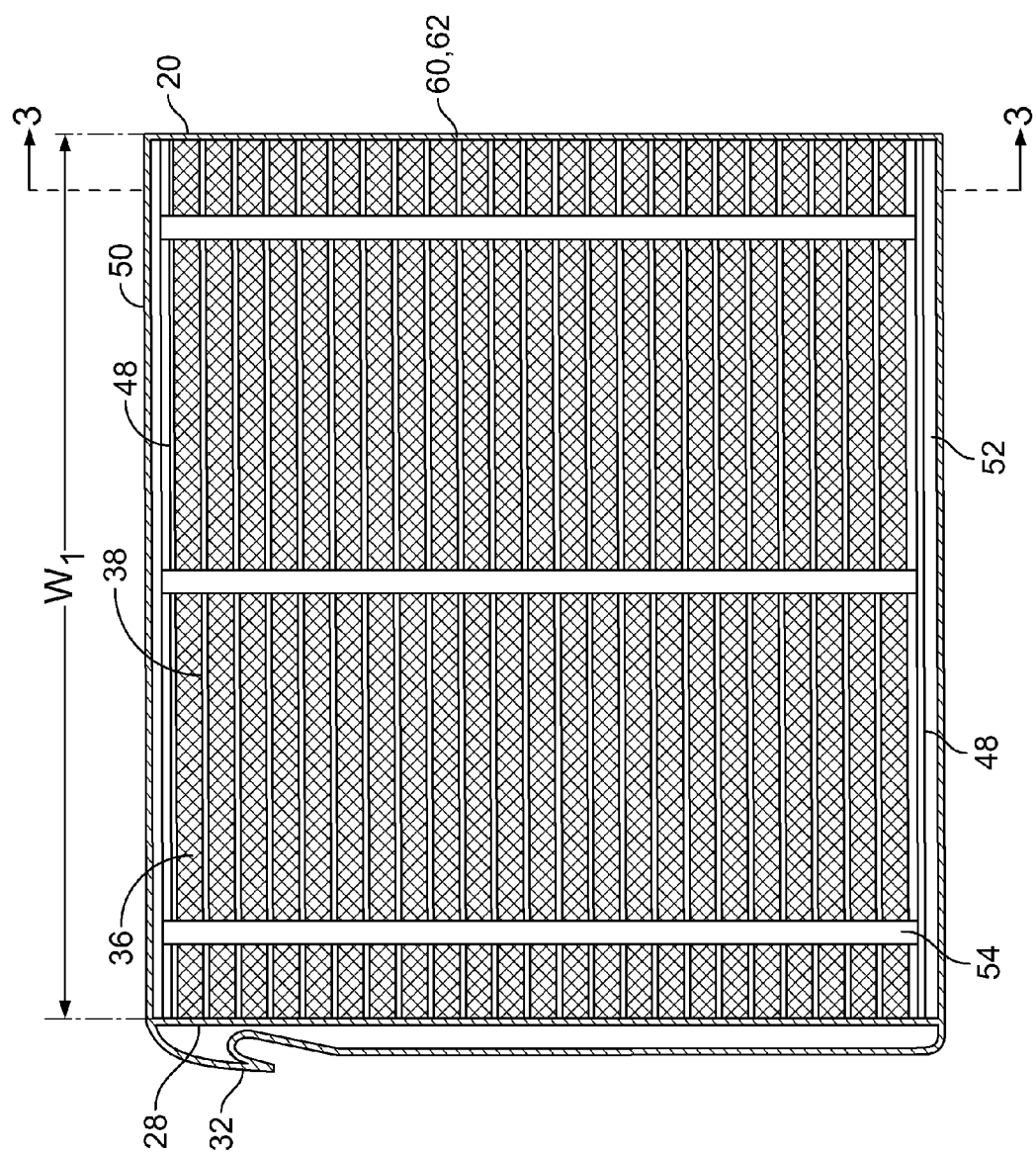
FIG. 2 is a longitudinal cross-sectional view of the frame and filter of FIG. 1.

As shown in FIGS. 1-3, filter 14 includes a filter media layer 34 and flexible support member 36. As is well known in the art, the filter media may be made of non-woven natural or synthetic fibers capable of extracting impurities from the air. However, the filter media layer 34 can be made of other known or later-developed materials.

Figure 5A:
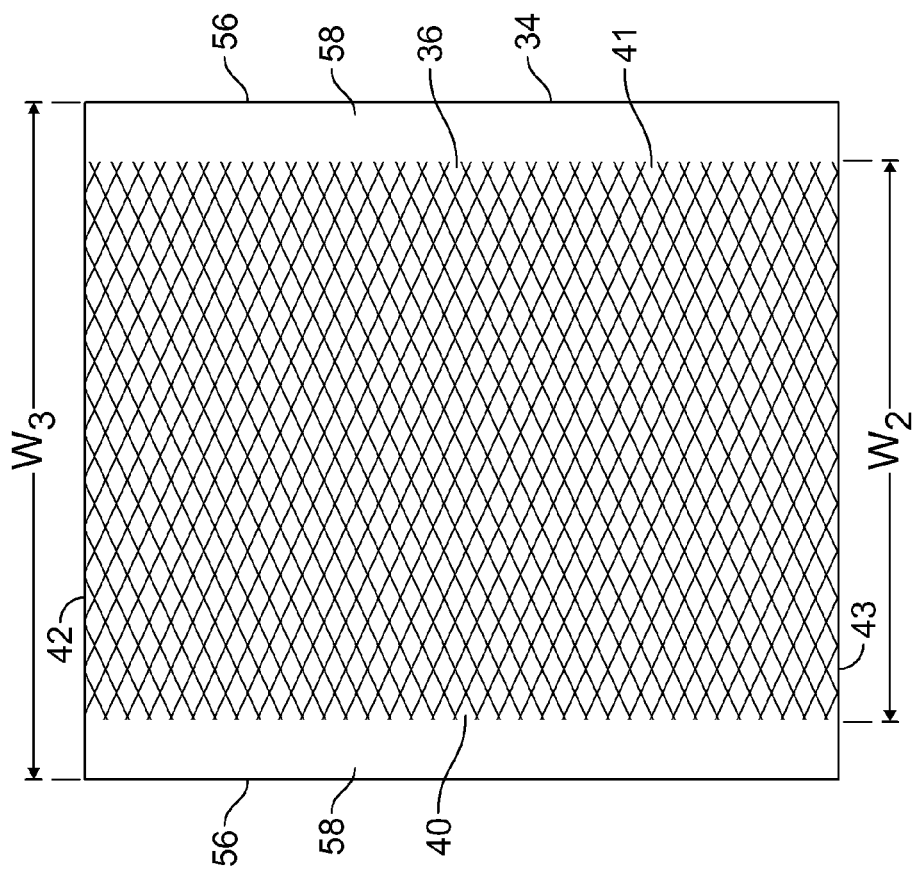
FIG. 5A is a plan view of a support member and the filter media layer.
Figure 5C:
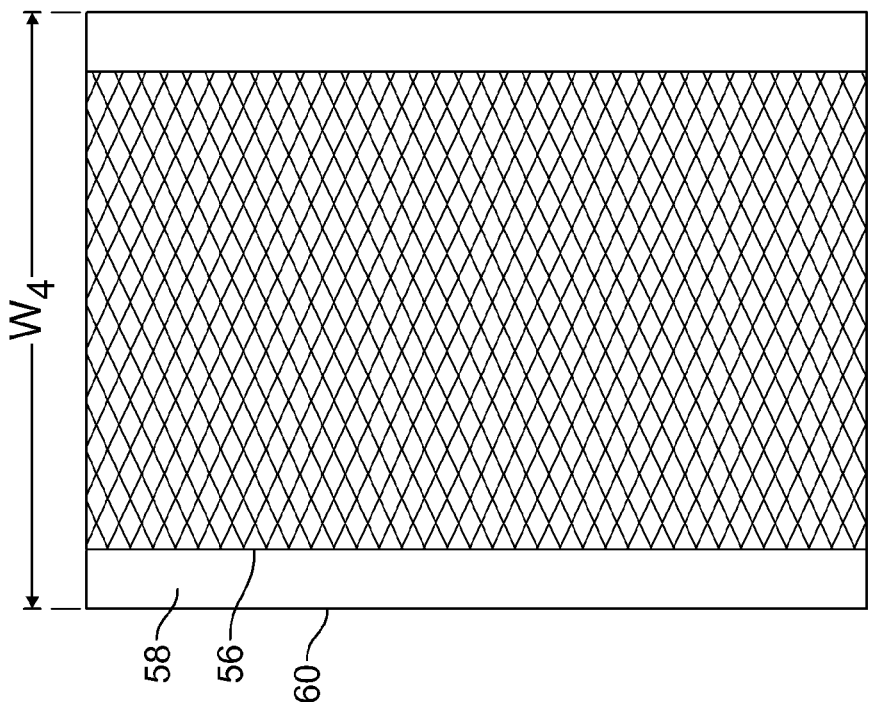
FIG. 5C is a plan view of the filter media layer folded over the support member.
Figure 5B:
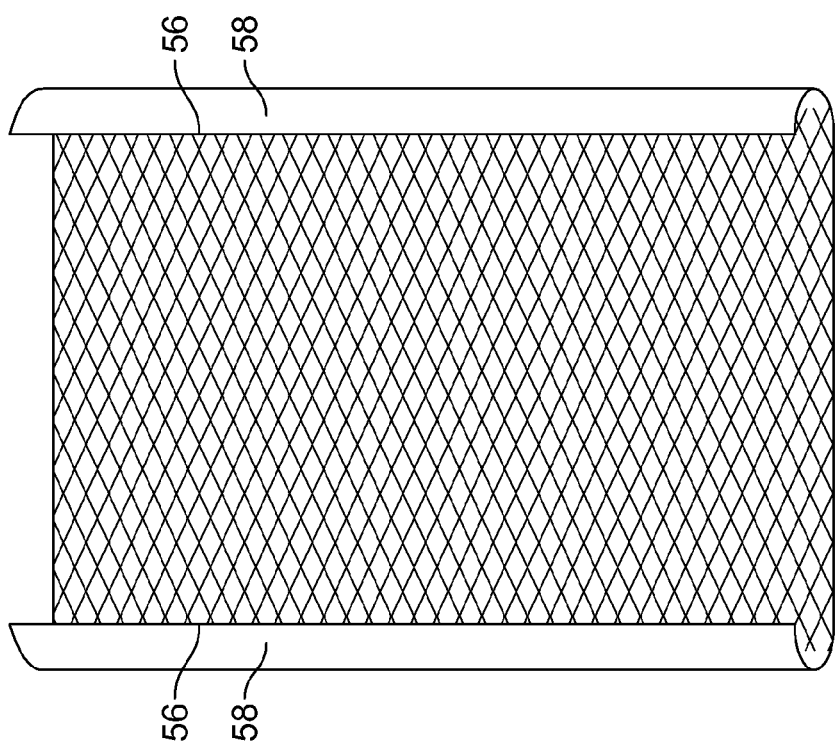
FIG. 5B is a plan view of the filter media layer partially folded over the support member.

The support member 36 is porous and flexible and is preferably fabricated from slit and expanded metal foil. However, the support member 36 could be made of plastic or other material. The support member 36 is more rigid than the filter media layer 34 and is preferably positioned on the downstream side of the filter media layer 34 in a direction of airflow as shown in FIG. 3. The filter support member 36 is generally planar and provides support to the filter media layer 34 to maintain a generally pleated shape of the filter 14. As shown in FIGS. 5A-5C, the filter support member 36 has side edges 40, 41, a top edge 42, a bottom edge 43, a first side surface 44, and a second side surface 46.

Referring back to FIG. 3, the filter 14 preferably includes a set of end caps 48 at the top and bottom ends, 50 and 52 respectively, of the filter 14. Each end cap 48 is attached to the filter media layer 34, the filter support member 36, or both. Each end cap 48 is configured to engage the guide tracks 30, thereby securing the end caps and the filter 14 in the enclosure 12. The end caps are generally parallel to the pleats.

FIG. 2 shows the filter 14 installed in the enclosure 12. The enclosure 12 has an interior width of $W_1$, measured as the distance from the interior surface of the rear wall 20 to the interior surface of the door 32 when the door is closed.

The filter 14 can optionally include one or more pleat spacer members 54 that extend between the end caps 48 and is connected to the end caps and the pleat edges 38. The spacer member 54 functions to maintain uniform pleat spacing between the generally parallel pleats, and provides structural support to the filter 14. Multiple spacer members 54 can be provided on one or both sides of the filter 14. The pleats are generally perpendicular to the side edges 40, 41.

Turning now to FIGS. 5A-5C, the filter media layer 34 and the support member 36 are shown. In FIG. 5A, the unpleated, flat support member 36 is shown attached to the flat, unpleated filter media layer 34. The support member 36 has a width $W_2$ measured as the distance between side edges 40 and 41 of the filter support member 36. The filter media layer 34 includes side edges 56 and has a width $W_3$ measured as the distance between the side edges of the filter media layer. The width $W_3$ is greater than $W_2$. Preferably, the support member 36 is centered on the filter media layer 34 in the width direction. Preferably, the filter media layer 34 completely covers one side of the support member 36. As shown in FIG. 5A, the filter media layer 34 includes skirt portions 58, which are portions of the filter media layer that extend beyond the side edges 40 and 41 of the support member 36. The filter media layer that extends beyond the first and second side edges 40, 41 forming the skirt is preferably continuous along the entire extension of the filter media.

Figure 4:
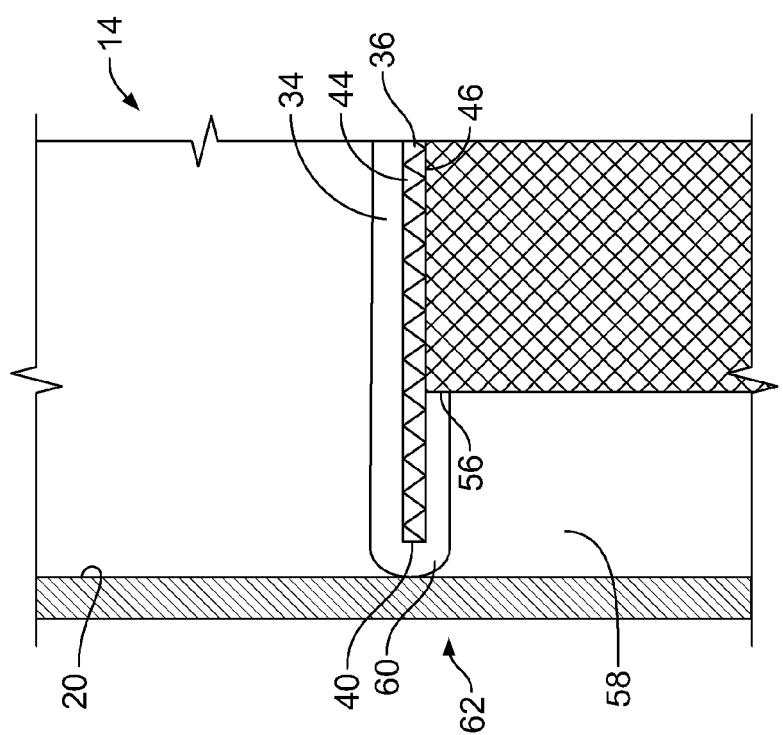
FIG. 4 is an enlarged detail of the frame and filter taken along line 4-4 of FIG. 3.

As shown in FIGS. 5B-5C, the skirt portions 58 of the filter media layer 34 are folded over the side edges 40, 41 of the support member 36. The skirt portion 58 covers and is folded over the side edges 40, 41 to a portion of a second side 46 of the support member 36 to extend from a first side 44 surface to a second side 46 surface in a generally parallel arrangement. As seen in FIG. 4, the skirt portion folds over the side edges 40, 41 and contacts the second side surface 46 of the support member 36. Preferably, the skirts 58 are folded over the side edges 40, 41 and are adhered or otherwise attached to the downstream surface of the support member 36. However, it is not necessary that the skirts 58 be attached to the second side 46 of the support member 36. As seen in FIG. 1, the folded skirts 58 have the generally parallel pleat configuration of the filter 14. A filter media cushion is thereby formed covering the side edges 40, 41 of the support member 36. The filter media cushion 60 prevents the end user from coming into contact with the side edges 40, 41 of the support member 36, which can be sharp and cause injury. The filter media cushion 60 also helps form an effective seal between the filter 14 and the enclosure 12, as described below.

The filter 14 has a width $W_4$ measured as the distance between the filter media cushions 60. The width $W_4$ should be equal to or greater than the width $W_1$ of the enclosure 12 and greater than the width $W_2$ of the support member 36. In other words:

$W_2 \leq W_1$ $W_1 \leq W_4$ $W_2 \leq W_4$

Since the width $W_4$ of the filter 14 is equal to or greater than the width $W_1$ of the enclosure 12, the filter 14 may closely fit within or be compressed in a width direction in order to fit into the enclosure 12. Specifically, cushions 60 represents the difference between $W_2$ and $W_4$. In other words, the difference between the width $W_4$ and the width $W_2$ is the added dimension of the one or more filter media cushions 60. As shown in FIG. 4, when the filter 14 is inserted into the enclosure 12, the filter media cushion 60 forms a compression point 62 where the filter media cushion contacts the rear wall surface 20 and/or the door 32. The support member 36 being more rigid than the filter media layer 34 is less likely to deform. Because of the seal formed at point 62, air flowing through the ductwork is directed to pass through the filter 14.

As shown in FIG. 4, the filter media layer 34 is folded over the side edges 40, 41 of the support member 36. The filter media cushion 60 covers the side edges 40, 41 of the support member 36. As the filter 14 is inserted into the enclosure 12, the filter media cushion 60 will conform to the rear wall 20, compressing the filter media at point 62. This compression point 62 allows the filter 14 to form an effective seal with the enclosure 12.

It should be appreciated that the term "effective seal" encompasses exemplary embodiments where air flowing from the air-inlet opening 24 to the air-outlet opening 26 directed primarily through the filter 14, rather than around it. It should be appreciated that the term "effective seal" does not necessarily mean that no air flows between around the filter media.

While only certain embodiments have been set forth, alternative embodiments and various modifications will be apparent from the above description to those skilled in the art. These and other alternatives are considered equivalents and within the spirit of scope of the present invention.

The invention claimed is:

1. A filter for an air cleaner having an enclosure comprising:
   a flexible support member having first and second surfaces and first and second side edges; and
   wherein the filter is generally planar and collapsible, and includes generally parallel pleats, wherein said generally parallel pleats are generally perpendicular to said first and second side edges of said flexible support member;
   a filter media layer attached to said first surface of said flexible support member, said filter media layer when unfolded extending beyond said first and second side edges of said flexible support member to form a skirt at each of said first and second side edges, wherein said skirts are folded over said first side edge and said second side edge of said flexible support member respectively to extend from said first surface to said second surface in a generally parallel arrangement, wherein said folded skirts are attached to the second surface of said flexible support member, and wherein said folded skirts have the generally parallel pleat configuration of the filter, forming a filter media cushion covering said at least one side edge.

2. The filter of claim 1, wherein said filter media cushion is compressible to conform to the enclosure when the filter is inserted into the enclosure.

3. The filter of claim 1, wherein opposing sides of said filter media layer are folded over both said first and second side edges of said flexible support member, thereby forming said filter media cushions on opposing sides of the filter.

4. The filter of claim 1, wherein said flexible support member is slit and expanded metal foil.

5. A filter for an air cleaner having an enclosure having a width $W_1$ comprising:
   a generally planar support member having a first surface and a second surface opposite said first surface, a top edge and a bottom edge opposite said top edge, and at least one side edge that is generally perpendicular to said top edge and said bottom edge;
   a filter media layer attached to and covering said first surface of said support member, a portion of said filter media layer being folded over said at least one side edge of said support member to contact said second surface such that said portion of said filter media layer contacting said second surface extends generally parallel to said filter media layer attached to said first surface, and such that at least a portion of said at least one edge is covered by said filter media layer which forms a filter media cushion;

wherein the filter is generally planar and collapsible, and includes generally parallel pleats, wherein said generally parallel pleats are generally perpendicular to said at least one side edge of said generally planar support member;

wherein said folded portion of said filter media is attached to said second surface of said support member, and wherein said folded portion of said filter media layer has the generally parallel pleat configuration of the filter;

wherein said support member has a width of $W_2$ that is less than or equal to $W_1$;

wherein said filter media layer has an unfolded width of $W_3$ that is greater than $W_2$; and wherein the filter has a width of $W_4$ that is greater than or equal to $W_1$.

6. The filter of claim 5, wherein said filter includes end caps attached to a top edge and a bottom edge of said support member, wherein said end caps are generally parallel to the pleats.

7. The filter of claim 5, wherein said support member is slit and expanded metal foil.

8. A filter for an air cleaner including a filter enclosure having a width $W_1$, and top and bottom channels, wherein the air cleaner is configured to cause air to flow through the filter enclosure from an upstream to a downstream direction, the filter comprising:

a flexible metal support member having a first and second side edges, a first surface and a second surface opposite of said first surface, and a top edge and a bottom edge that are generally perpendicular to said first and second side edges, said flexible metal support member having a width $W_2$ substantially equal to but less than $W_1$;

a filter media layer connected to and covering at least one of said first surface and said second surface of said flexible metal support member and having an unfolded width $W_3$ greater than $W_2$, such that said filter media layer when unfolded extends beyond said first and second side edges of said flexible metal support member forming a first media skirt and a second media skirt, wherein both of said first media skirt and said second media skirt are defined by a portion of said filter media layer that is continuous along the entire extension of said filter media layer beyond said first and second side edges;

wherein said first media skirt and said second media skirt are folded over the respective first and second side edges of said flexible metal support member so as to cover said first and second side edges and form filter media cushions on said first and second side edges of the filter, wherein when said first media skirt and said second media skirt are folded over, the filter has a width $W_4$ that is substantially equal to but greater than $W_1$ such that when the filter is positioned in the filter enclosure, said filter media cushions are compressed thereby forming a seal between the filter and the filter enclosure;

wherein the filter is configured to be positioned in the filter enclosure with said flexible metal support member downstream from said filter media with respect to the direction of airflow;

wherein said filter is generally planar, pleated and collapsible, where said first and second side edges of said flexible metal support member are generally perpendicular to the pleats, wherein said folded first and second media skirts contact said second surface of said flexible metal support member, and wherein said folded first and second media skirts have the generally parallel pleat configuration of the filter; and a pair of end caps attached to said top edge and said bottom edge, respectively, of said flexible metal support member, said pair of end caps being configured to engage the top and the bottom channels, respectively, of the filter enclosure.

* * * * *